(12) United States Patent
DaDalt

(10) Patent No.: US 7,230,458 B2
(45) Date of Patent: Jun. 12, 2007

(54) DELTA/SIGMA FREQUENCY DISCRIMINATOR

(75) Inventor: Nicola DaDalt, Villach (AT)

(73) Assignee: Infineon Technologies AG, Munich (DE)

( * ) Notice: Subject to any disclaimer, the term of this patent is extended or adjusted under 35 U.S.C. 154(b) by 94 days.

(21) Appl. No.: 10/952,646

(22) Filed: Sep. 29, 2004

(65) Prior Publication Data

US 2005/0184901 A1 Aug. 25, 2005

(30) Foreign Application Priority Data

Feb. 25, 2004 (DE) .................. 10 2004 009 116

(51) Int. Cl.
*H03B 19/00* (2006.01)

(52) U.S. Cl. ...................... 327/113; 327/117

(58) Field of Classification Search .............. None
See application file for complete search history.

(56) References Cited

U.S. PATENT DOCUMENTS

| | | | | | |
|---|---|---|---|---|---|
| 3,778,724 | A | * | 12/1973 | Perlman ...................... | 327/114 |
| 4,779,063 | A | * | 10/1988 | Nagaoka ...................... | 331/135 |
| 5,216,387 | A | * | 6/1993 | Telewski et al. .............. | 331/11 |
| 5,781,044 | A | * | 7/1998 | Riley et al. .................. | 327/105 |
| 5,834,987 | A | * | 11/1998 | Dent .......................... | 332/127 |
| 5,901,188 | A | * | 5/1999 | Roither ...................... | 375/360 |
| 5,986,512 | A | * | 11/1999 | Eriksson ...................... | 331/16 |
| 6,002,278 | A | * | 12/1999 | Saito .......................... | 327/115 |
| 6,456,164 | B1 | * | 9/2002 | Fan ............................ | 331/16 |
| 6,570,418 | B2 | * | 5/2003 | Uehara ........................ | 327/141 |
| 6,603,360 | B2 | * | 8/2003 | Kim et al. .................... | 331/1 A |
| 6,897,691 | B2 | * | 5/2005 | Chen et al. ................... | 327/153 |
| 6,946,915 | B2 | * | 9/2005 | Zhang ......................... | 331/1 A |

FOREIGN PATENT DOCUMENTS

WO WO 2005/078934 A1 * 8/2005

OTHER PUBLICATIONS

Beards et al., "An Oversampling Delta-Sigma Frequency Discriminator," *IEEE Transactions on Circuit and Systems II: Analog and Digital Signal Processing*, vol. 41, No. 1, Jan. 1994.
Hövin, Mats E., "First-Order Frequency Delta-Sigma Modulation," *Dr. Scient thesis*, University of Oslo, Jan. 2000.

* cited by examiner

*Primary Examiner*—Timothy P. Callahan
*Assistant Examiner*—Cassandra Cox
(74) *Attorney, Agent, or Firm*—Jenkins, Wilson, Taylor & Hunt, P.A.

(57) ABSTRACT

Delta/sigma frequency discriminator (1) for converting a frequency ($F_v$) of an input signal into a digital output signal (C) comprising a frequency divider (8) which divides the input signal at a frequency dividing ratio which can be switched in dependence on the digital output signal (C), with at least one sampling register (12) which samples the divided input signal by means of a reference clock signal for generating the digital output signal (C), and with a dither circuit (15) which varies the clock period (T) of the reference clock signal so that interfering modulation tones in the signal spectrum of the digital output signal (C) are suppressed.

27 Claims, 7 Drawing Sheets

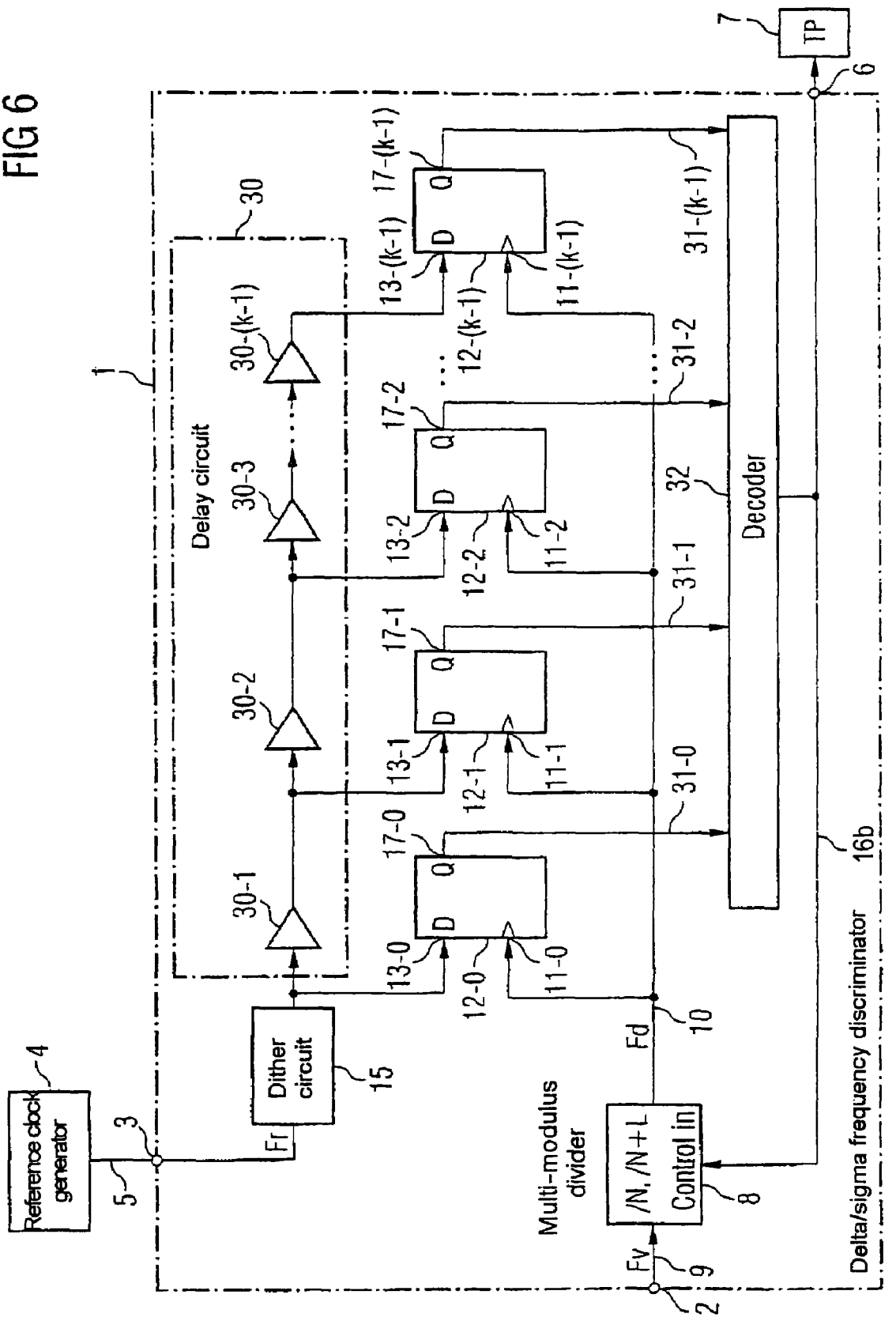

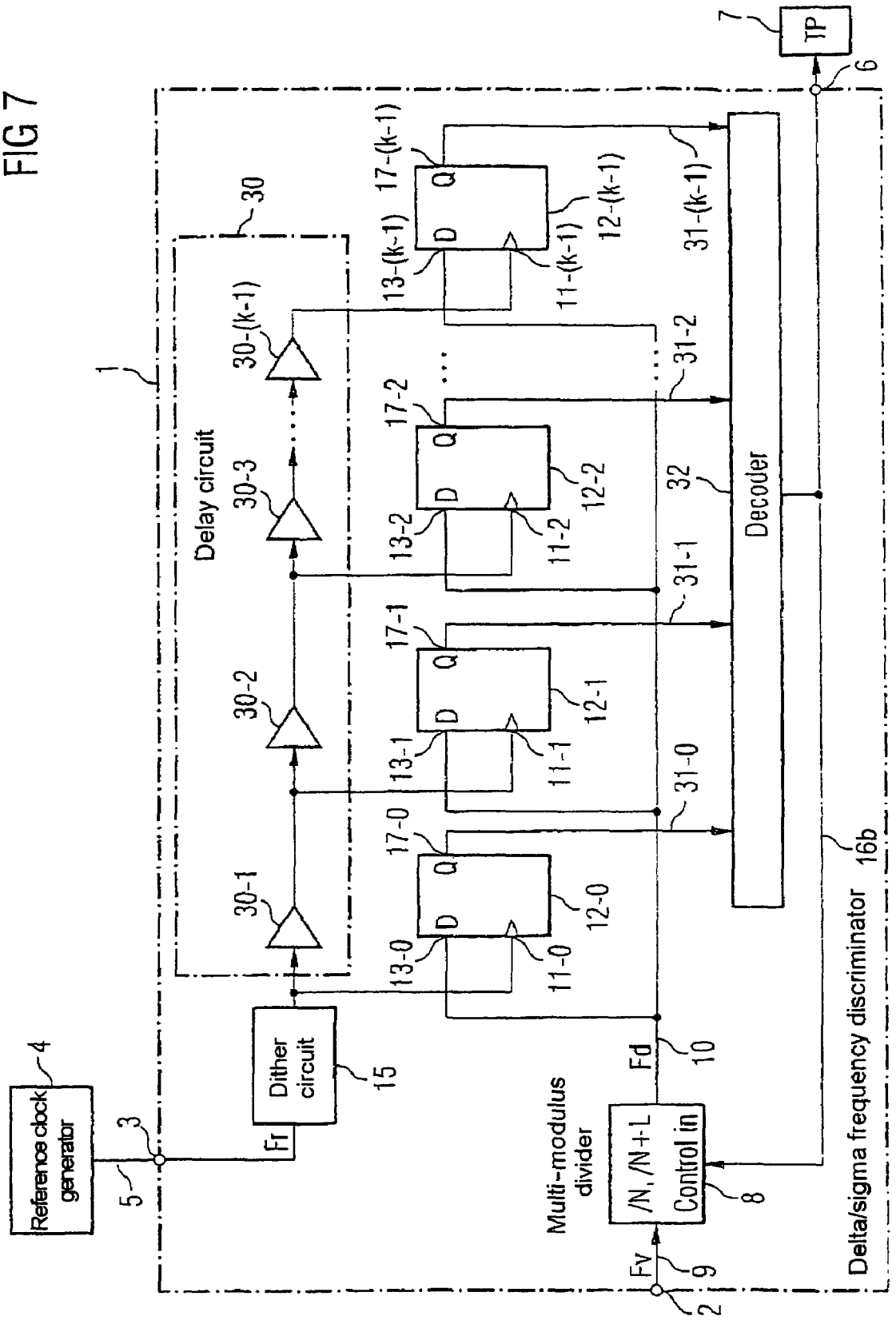

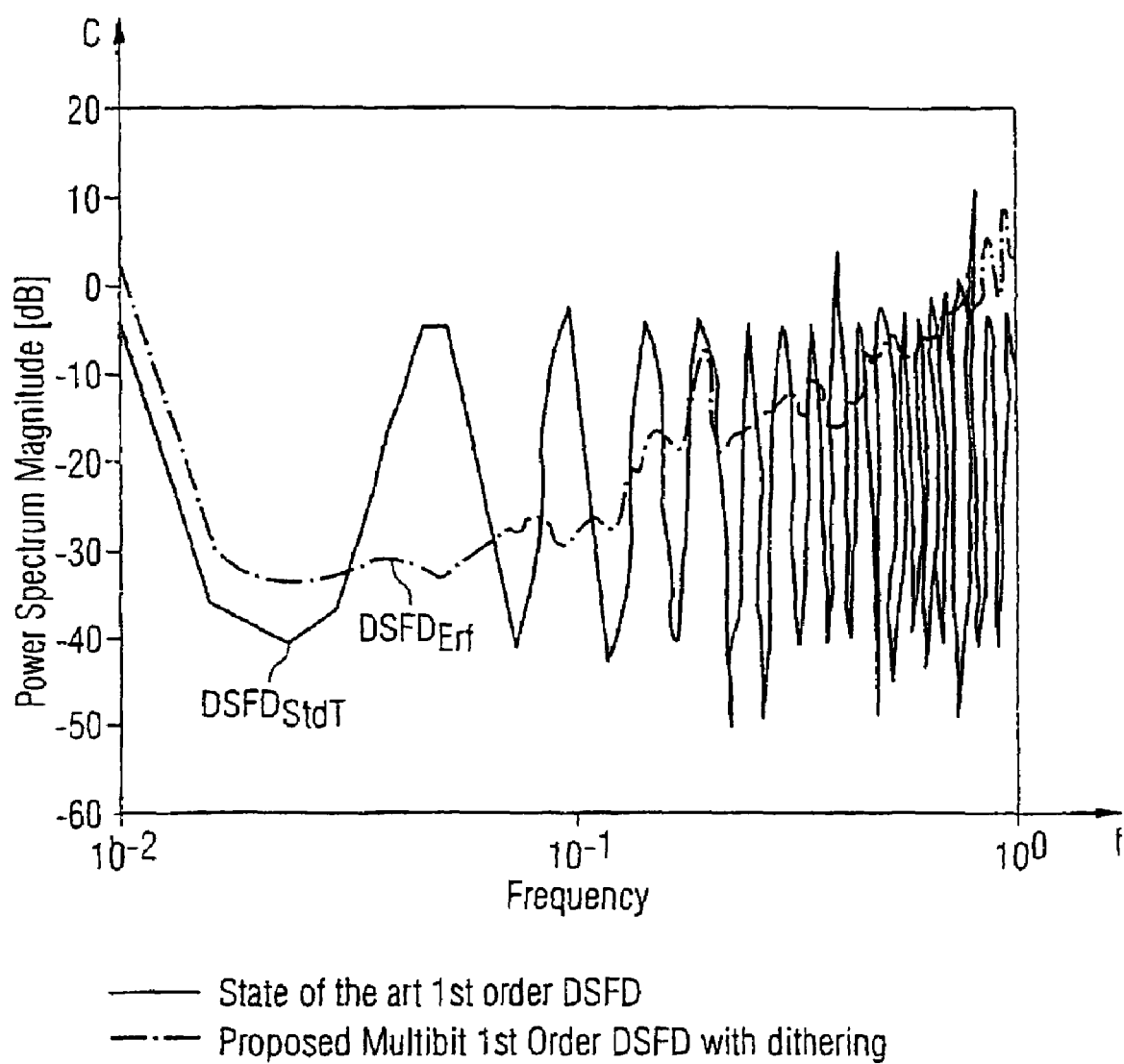

DELTA/SIGMA FREQUENCY DISCRIMINATOR

TECHNICAL FIELD

The invention relates to a delta/sigma frequency discriminator for converting a frequency of an input signal into a digital output signal.

BACKGROUND

Frequency discriminators or frequency demodulators are widely used and are used in frequency synthesizers or as demodulators in frequency modulation receivers.

FIG. 1 shows a delta/sigma frequency discriminator (DSFD) according to the prior art as described in R. Beards, M. Copelend, "An Oversampling Delta-Sigma Frequency Discriminator", IEEE Trans. On Circuits and Systems II, Vol. 41, Vol. 1, January 1994. The delta/sigma frequency discriminator receives an input signal at an input E1 and a reference clock signal at an input E2. The delta/sigma frequency discriminator (DSFD) determines the frequency of the input signal and outputs a corresponding digital value at its output A. For this purpose, the delta/sigma frequency discriminator (DSFD) according to the prior art as shown in FIG. 1 contains a dual modulus frequency divider which divides the input signal at the signal input E1 at a frequency dividing ratio which can be switched in dependence on the digital output signal. A sampling register samples the divided input signal by means of the reference clock signal for generating the digital output signal. The reference clock signal is generated, for example, by a reference clock generator.

In the delta/sigma frequency discriminator DSFD according to the prior art, a digital output signal is generated which consists of a one-bit datastream. Depending on the logical state of the output signal, the frequency dividing ratio of the frequency divider is switched between a first frequency dividing ratio N and a second frequency dividing ratio N+L, where N, L are two suitable integer values. The delta/sigma frequency discriminator measures the frequency $F_v$ of the input signal in comparison with the frequency $F_R$ of the reference clock signal.

The following applies:

$$\text{Mean value}[C] = \frac{F_v}{(N+L)/2} - F_R \quad (I)$$

where C represents the digital output signal.

L is typically selected to be much smaller than N, for example N=92 and L=4. The digital datastream C at the output of the delta/sigma frequency discriminator DSFD represents the frequency difference between the input signal, which has a relatively high frequency, and the low-frequency reference clock signal. The reference clock signal is generated by a reference clock generator, for example a crystal oscillator. The delta/sigma frequency discriminator DSFD measures the frequency $F_v$ of the input signal. The output datastream exhibits a first-order quantization noise (+20 DB/DEC).

However, the delta/sigma frequency discriminator (DSFD) according to the prior art as shown in FIG. 1 has the disadvantage that in a frequent case when the frequency $F_v$ of the input signal is constant, strong interfering modulation tones occur in the signal spectrum of the digital output signal (C). The same problem occurs in first-order delta/sigma modulators. The base frequency of the interfering modulation tones depends on the difference between the frequency $F_v$ of the input signal and the frequency $F_R$ of the reference clock signal. It can happen that the interfering modulation tones occur within the low frequency band so that they can no longer be eliminated by a subsequent digital low-pass filtering. This leads to a considerable deterioration in the performance of the data processing system.

It has been attempted, therefore, to eliminate the interfering modulation tones by increasing the order of the delta/sigma frequency discriminator. For example, second- and third-order delta/sigma frequency discriminators (DSFD) have been proposed, for example in I. Galton, "A Practical Second Order Delta Sigma Frequency to Digital Converter", IEEE Inter. Symposium on Circuits and Systems, 1995, and M. Hovin et al., "Novel Second Order Delta-Sigma Modulator Frequency to Digital Converter", Electronic Letters, Vol. 31, No. 2, January 1995 or T. Riley et al., "A two-loop Third Order Multistage Delta-Sigma Frequency to Digital Converter", IEEE Intern. Symposium on Circuits and Systems, 1998. However, these delta/sigma frequency discriminators (DSFD) need analog circuit sections for implementing integrators in the feedback loop or providing charge pumps. Although the proposed delta/sigma frequency discriminators partially attenuate or suppress the interfering modulation tones at the output, they can only be implemented with complex circuitry, especially due to the analog circuit sections.

SUMMARY OF THE INVENTION

It is, therefore, the object of the invention to create a delta/sigma frequency discriminator which converts the frequency of an input signal into a digital output signal and at the same time suppresses with little circuit complexity interfering modulation tones which occur when the frequency of the input signal remains largely constant.

According to the invention, this object is achieved by a delta/sigma frequency discriminator having the features specified in Claim 1 and by means of a delta/sigma frequency discriminator having the features specified in Claim 24.

The invention creates a delta/sigma frequency discriminator for converting a frequency of an input signal into a digital output signal comprising a frequency divider which divides the input signal at a frequency dividing ratio which can be switched in dependence on the digital output signal, with at least one sampling register which samples the divided input signal by means of a reference clock signal for generating the digital output signal and with a dither circuit which varies the clock period (T) of the reference clock signal so that interfering modulation tones in the signal spectrum of the digital output signal are suppressed.

In a preferred embodiment of the delta/sigma frequency discriminator according to the invention, the clock period (T) of the reference clock signal is preferably randomly varied by the dither circuit.

In a preferred embodiment of the delta/sigma frequency discriminator, the frequency of the input signal is higher than the clock frequency of the reference clock signal.

The reference clock signal is preferably generated by a reference clock generator.

The sampling register is preferably a D-type flip-flop.

The D-type flip-flop preferably has a clock signal input at which the input signal divided by the frequency divider is present.

The D-type flip-flop also preferably has a data input which is connected to the dither circuit.

In an alternative embodiment, the D-type flip-flop has a clock signal input which is connected to the dither circuit.

In this alternative embodiment, the flip-flop preferably has a data input at which the input signal divided by the frequency divider is present.

In a preferred embodiment, the D-type flip-flop has a data output for delivering the digital output signal, which is connected to the frequency divider via a control line.

In a particularly preferred embodiment of the delta/sigma frequency discriminator according to the invention, the digital output signal is filtered by a subsequent digital low-pass filter.

The dither circuit of the delta/sigma frequency discriminator according to the invention preferably contains a signal delay chain with a number of serially interconnected signal delay elements which delay the application of the reference clock signals and a multiplexer with a number of inputs which are in each case connected to one output of a delay element, the multiplexer switching the inputs through to its output in dependence on a random control signal.

In a preferred embodiment, this circuit has a random signal generator for generating the random control signal.

In a preferred embodiment, the dither circuit also contains a synchronizing circuit which synchronizes the switching between the inputs of the multiplexer.

In a further embodiment of the delta/sigma frequency discriminator according to the invention, a number of sampling registers are connected together in parallel.

The sampling registers connected together in parallel are preferably D-type flip-flops.

In one embodiment, the divided input signal is present at the clock signal inputs of the D-type flip-flops.

In an alternative embodiment, the clock signal inputs of the D-type flip-flops are connected to the dither circuit.

In a further embodiment, the dither circuit is followed by a signal delay circuit having a number of serially interconnected signal delay elements.

In this arrangement, the outputs of the signal delay elements are preferably connected to the data inputs of the D-type flip-flops connected together in parallel.

In an alternative embodiment, the outputs of the signal delay elements are connected to the clock signal inputs of the D-type flip-flops connected together in parallel.

The outputs of the flip-flops connected together in parallel are preferably connected to a decoder which delivers the digital output signal.

The frequency divider is preferably a multi-modulus frequency divider.

The invention also creates a delta/sigma frequency discriminator for converting a frequency of an input signal into a digital output signal, comprising a frequency divider which divides the input signal at a frequency dividing ratio which can be switched in dependence on the digital output signal, a delay circuit, consisting of a number of delay elements, for delaying a reference clock signal, the signal outputs of the delay elements being connected to sampling registers which sample the delayed reference clock signal by means of the divided input signal for generating a quantized reference clock signal comprising a number of bits, and with a decoder which decodes the quantized reference clock signal for generating the digital output signal.

In this arrangement, the digital output signal is preferably filtered by a subsequent digital low-pass filter.

The sampling registers are preferably D-type flip-flops.

The frequency divider is preferably a multi-modulus frequency divider.

In a preferred embodiment of the delay circuit, it is preceded by a dither circuit which randomly varies the clock period of the reference clock signal.

The invention also creates a method for converting a frequency of an input signal into a digital output signal, comprising the following steps:

dividing an input signal at a frequency dividing ratio,
  sampling the divided input signal by means of a reference clock signal for generating a digital output signal, the clock period of the reference clock signal being varied for suppressing interfering modulation tones in the signal spectrum of the digital output signal, and
switching the frequency dividing ratio in dependence on the digital output signal.

In the text which follows, preferred embodiments of the delta/sigma frequency discriminator according to the invention and of the method according to the invention for converting a frequency of an input signal into a digital output signal are described with reference to the attached figures for explaining features essential to the invention.

BRIEF DESCRIPTION OF THE DRAWINGS

FIG. 6 shows a fourth embodiment of the delta/sigma frequency discriminator according to the invention;

FIG. 7 shows a fifth embodiment of the delta/sigma frequency discriminator according to the invention;

FIG. 8 shows the output signal spectrum of the delta/sigma frequency discriminator according to the invention in comparison with a conventional delta/sigma frequency discriminator.

DETAILED DESCRIPTION OF THE INVENTION

Figure 2:
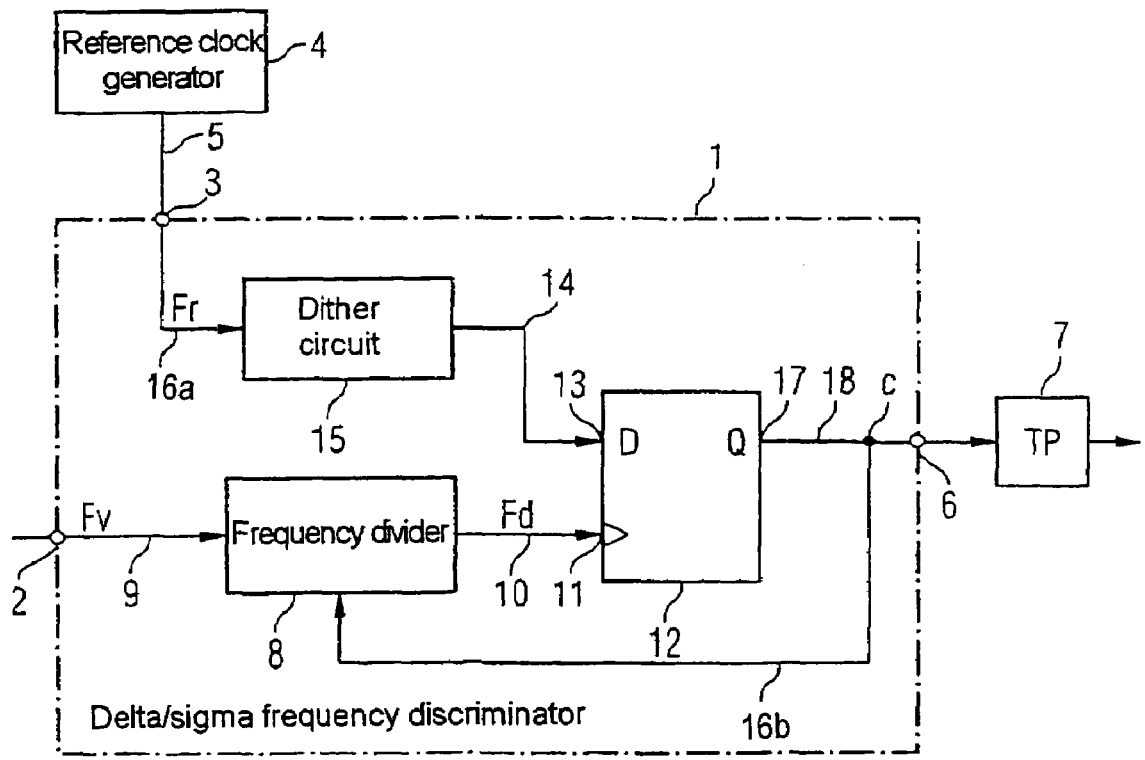
FIG. 2 shows a first embodiment of the delta/sigma frequency discriminator according to the invention.

FIG. 2 shows a first preferred embodiment of the delta/sigma frequency discriminator 1 according to the invention. The delta/sigma frequency discriminator 1 according to the invention exhibits a first signal input 2 for applying an input signal and a second signal input 3 for applying a reference clock signal. The reference clock signal is generated by a reference clock generator 4 and applied to the second signal input 3 of the delta/sigma frequency discriminator 1 by a line 5. The delta/sigma frequency discriminator 1 is used for converting the frequency of the input signal present at the first signal input 2 into a digital output signal. The digital output signal is output by the delta/sigma frequency discriminator 1 at a digital signal output 6 and preferably filtered by a subsequent digital low-pass filter 7.

The delta/sigma frequency discriminator 1 contains a frequency divider 8, the input of which is connected to the first signal input 2 by a line 9 for receiving the input. The output of the frequency divider 8 is connected via a line 10 to a clock signal input 11 of a sampling register 12, the data input 13 of which is connected to a dither circuit 15 via a line 14. The input of the dither circuit 15 is connected to the second signal input 3 of the delta/sigma frequency discriminator 1 via a line 16a for receiving the reference clock signal. The frequency divider 8 divides the received input signal at a frequency dividing ratio which can be switched via a control line 16a. The control line 16b is connected to the output 17 of the sampling register 12. The sampling register 12 samples the divided input signal by means of the reference clock signal for generating the digital output signal, the digital output signal being delivered to the digital signal output 6 of the delta/sigma frequency discriminator 1 via a line 18. The input signal is typically an input clock signal, the clock frequency of which is converted into a digital output signal by the delta/sigma frequency discriminator 1.

The dither circuit 15 changes the clock period (T) of the reference clock signal present at the signal input 3 in such a manner that interfering modulation tones in the signal spectrum of the digital output signal, which is output to the digital signal output 6 of the delta/sigma frequency discriminator 1, are suppressed. At the same time, the clock period T of the reference clock signal is preferably randomly varied by the dither circuit 15.

The frequency $F_v$ of the input signal present at the signal input 2 is typically much higher than the clock frequency $F_R$ of the reference clock signal present at the signal input 3, which is generated by the reference clock generator 4. The reference clock generator 4 generates a highly accurate reference clock signal with a constant clock period T. The reference clock generator 4 is preferably a crystal oscillator. In an alternative embodiment, the reference clock signal is formed by a system clock signal.

In the embodiment of the delta/sigma frequency discriminator 1 shown in FIG. 2, the sampling register 12 is a D-type flip-flop, the clock signal input 11 of which receives the input signal divided by the frequency divider 8, the data input 13 of the D-type flip-flop being connected to the dither circuit 15.

Figure 3:
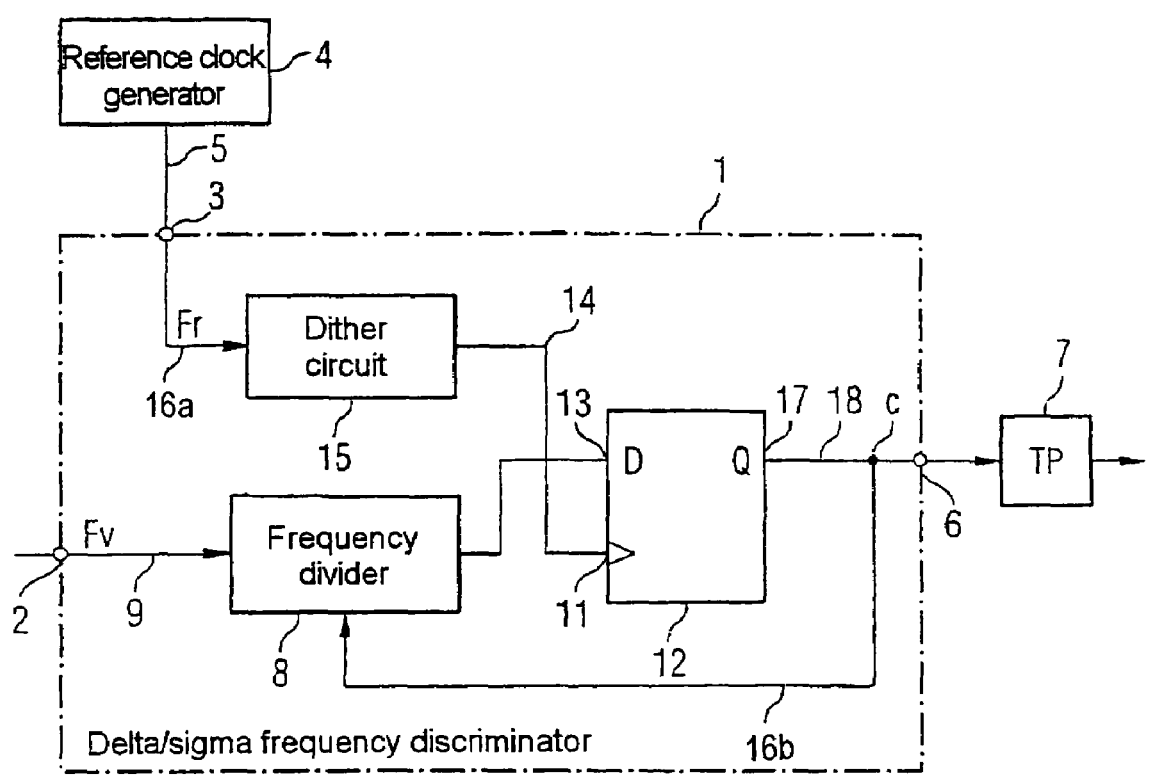
FIG. 3 shows a second embodiment of the delta/sigma frequency discriminator according to the invention.

In the alternative embodiment shown in FIG. 3, the data input 13 of the D-type flip-flop 12 is connected to the output of the frequency divider 8 and the clock signal input 11 of the D-type flip-flop 12 is connected to the dither circuit 15, i.e. the inputs of the sampling register 12 in the second embodiment of the delta/sigma frequency discriminator 1 shown in FIG. 3 are exchanged in comparison with the first embodiment shown in FIG. 2. In both embodiments, the data output 17 of the D-type flip-flop 12 is connected to a control input of the frequency divider 8 via the control line 16b so that the frequency dividing ratio of the frequency divider 8 is switched in dependence on the digital output signal.

The dither circuit 15 randomly varies the clock period (T) of the reference clock signal. When the frequency of the input signal remains constant over a relatively long period, the consequence is that the digitized output signal remains at a particular digital output value. If the analog input signal, for example, has a very small signal deviation, this is only represented by the least significant bit (LSB). In this case, the digital output signal is formed by a squarewave signal which represents the quantization noise. The quantization noise thus comprises harmonic signal components. The dither circuit 15 adds a random signal with little signal deviation to the analog input signal so that the digital output signal does not contain any interfering modulation tones when the input signal remains constant. By adding a signal with a wide signal spectrum, a repetitive data pattern leading to interfering modulation tones is broken up. Due to the fluctuation or dithering of the reference clock signal, no repetitive data pattern is created at the digital output 6 of the delta/sigma frequency discriminator 1 according to the invention even if an input signal with a long-term constant frequency is applied so that interfering modulation tones in the signal spectrum of the digital output signal are minimized. Due to the balanced operation of the D-type flip-flop 12, it is possible to connect the dither circuit 15 both to the data signal input 13 or to the clock signal input 11 of the D-type flip-flop 12.

Figure 4:
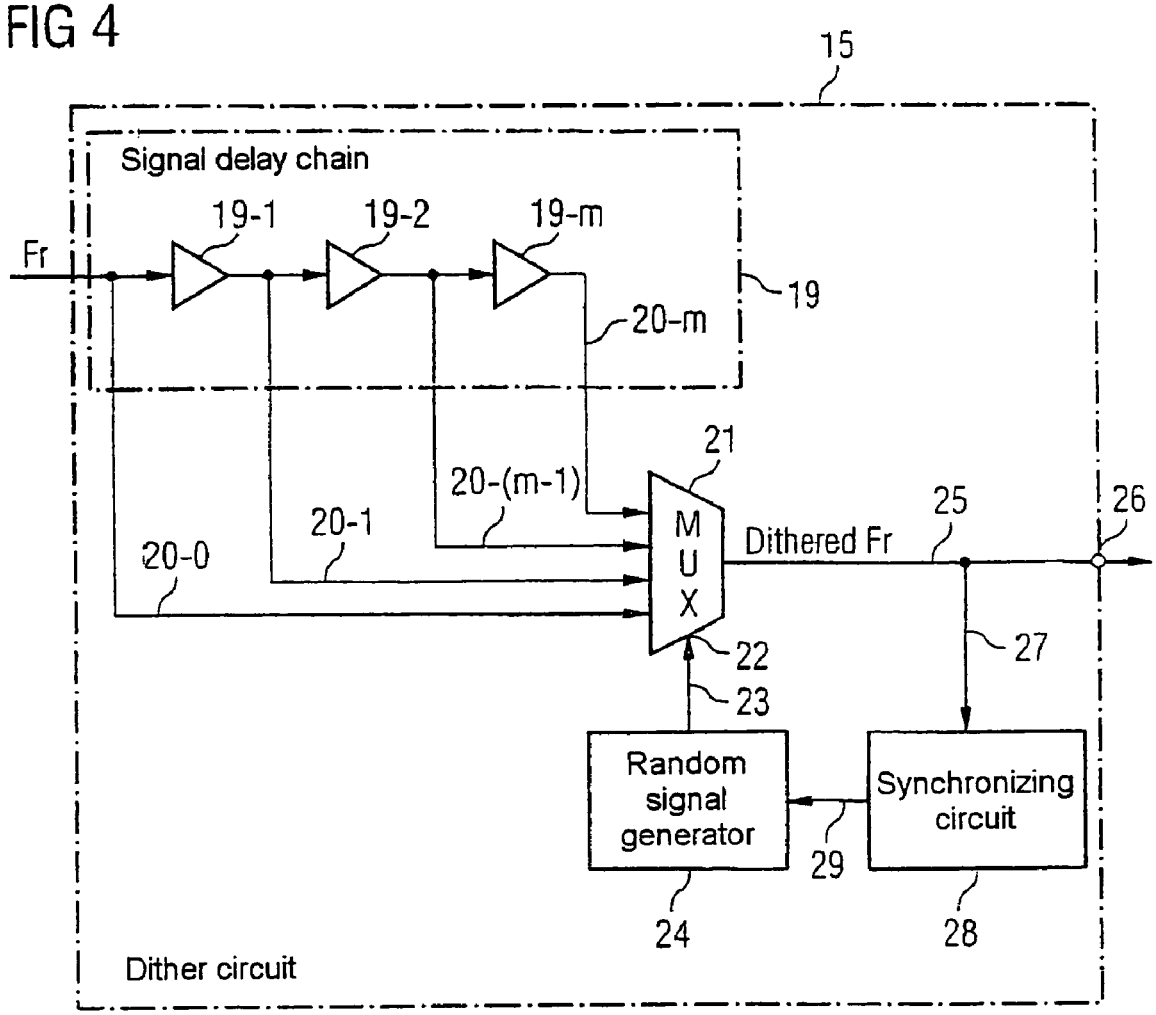
FIG. 4 shows a preferred embodiment of a dither circuit according to the invention.

FIG. 4 shows a preferred embodiment of the dither circuit 15 used in the delta/sigma frequency discriminator 1 according to the invention. The dither circuit 15 preferably obtains a signal delay chain 19 which consists of m signal delay elements 19-i. The signal delay elements 19-i are serially interconnected, the first signal delay element 19-1 of the signal delay chain 19 receiving the reference clock signal in the embodiment shown in FIG. 2 and the divided input signal output by the frequency divider 8 in the embodiment shown in FIG. 3. The signal outputs of the signal delay elements 19-i are connected to inputs of a multiplexer 21 via lines 20-i. The multiplexer 21 exhibits a control input 22 which is controlled by a random signal generator 24 via a control line 23. The random signal generator 24 generates a random control signal. The multiplexer 21 switches the inputs in dependence on the random control signal through to an internal line 25 which is connected to an output 26 of the dither circuit 15.

The output 26 of the dither circuit 15 is connected to the data input 13 of the sampling register 12 via the line 14 in the embodiment shown in FIG. 2 and to the clock signal input 11 of the sampling register 12 via the line 14 in the embodiment shown in FIG. 3. At the internal line 25, a synchronizing circuit 28 is connected via an internal line 27, which synchronizing circuit controls the random signal generator 24 via a line 29 in such a manner that the switching between the inputs of the multiplexer 21 is synchronized. This prevents glitches or noise pulses at the output of the multiplexer 21. In an embodiment not shown in greater detail, the signal inputs 20-i of the multiplexer 21 are additionally connected to the synchronizing circuit 28.

Due to the random switching between the signal inputs 20-i of the multiplexer 21, the signal present at the signal delay chain 19 is randomly delayed so that the frequency of the signal output by the dither circuit 15 fluctuates slightly.

Figure 5:
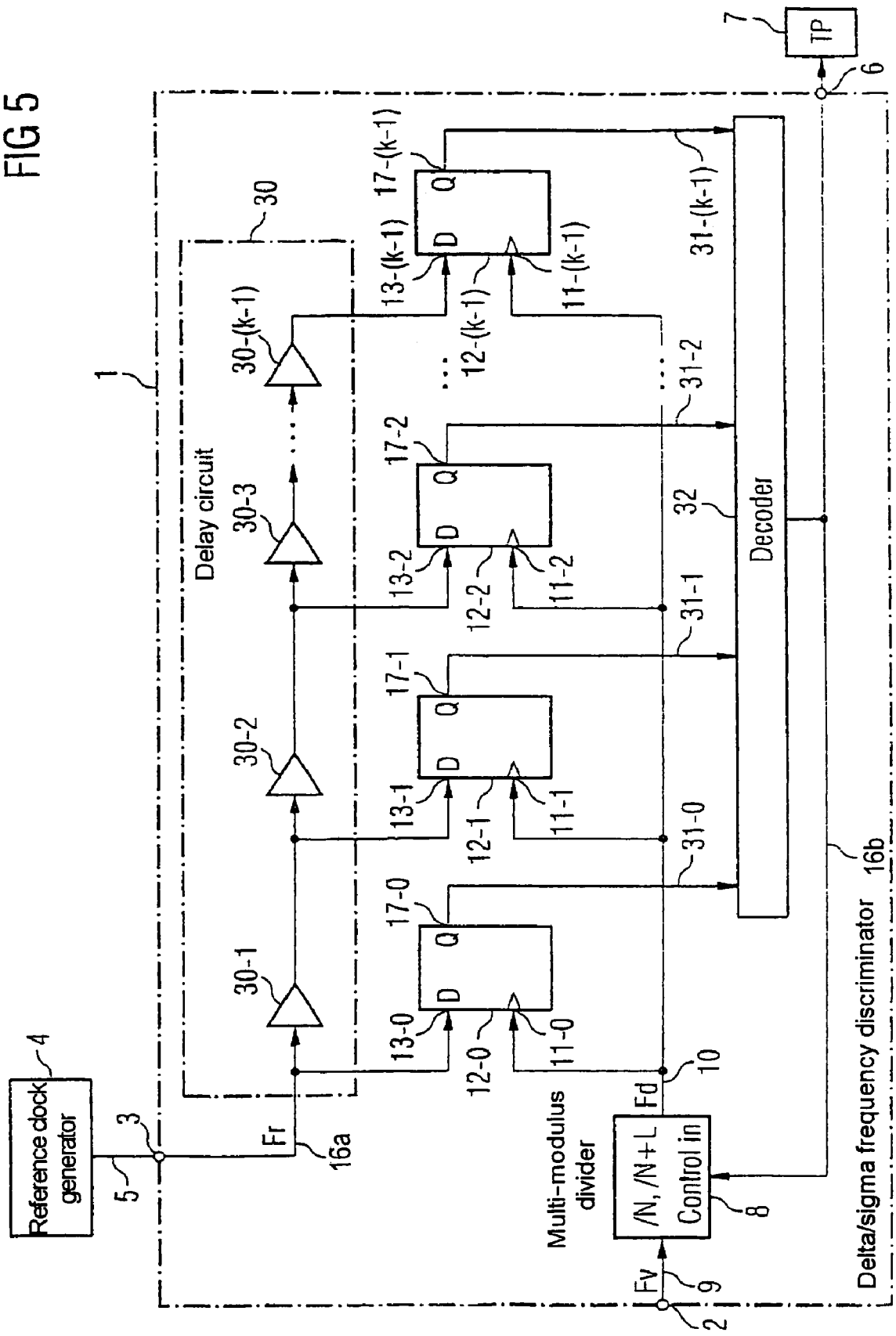
FIG. 5 shows a third embodiment of the delta/sigma frequency discriminator according to the invention.

The delta/sigma frequency discriminators 1 according to the invention, shown in FIGS. 2 and 3, exhibit a digital one-bit data output 6. FIG. 5 shows a third embodiment of the delta/sigma frequency discriminator 1 according to the invention with a multi-bit data output. The delta/sigma frequency discriminator 1 according to the third embodiment shown in FIG. 5 contains a multi-modulus frequency divider 8 which divides the input signal present at the signal input 2 at a frequency dividing ratio which can be switched in dependence on the digital output signal.

In contrast to the embodiments shown in FIG. 2 and 3, the delta/sigma frequency discriminator shown in FIG. 5 exhibits a number of sampling registers 12-i connected together in parallel. The sampling registers 12-c are formed by D-type flip-flops. In the embodiment shown in FIG. 5, the delta/sigma frequency discriminator 1 exhibits K D-type flip-flops 12-i connected together in parallel. The clock signal inputs 11-i of the D-type flip-flops 12-i are connected to the output line 10 of the multi-modulus frequency divider 8 and receive the divided input signal. The delta/sigma frequency discriminator 1 contains a delay circuit 30 in which K-1 delay elements, which in each case exhibit a particular signal delay time τ, are serially connected together. In the embodiment shown in FIG. 5, the delay circuit 30 receives at its input the reference clock signal which is present at the signal input 3 and which is generated by the reference clock generator 4. A signal output of a delay element 30-i is in each case connected to the data input 13-i of a D-type flip-flop 12-i. The data output 17-i of a D-type flip-flop 12-i is in each case connected to the input of a decoder 32 via a line 33-i. The reference clock signal present at the delay circuit 30 is sampled by the delay circuit 30 and by the sampling register consisting of the sampling D-type flip-flops in order to generate a quantized reference clock signal comprising a number of bits. This provides a finer time quantization of the reference clock signal. The D-type flip-flops 12-i generate a thermometer-coded representation of the relative time delay between the rising signal edges of the divided input signal, which is present at line 10, and of the reference clock signal which is applied to the signal input 3 of the delta/sigma frequency discriminator 1.

The data outputs 17-i of the D-type flip-flops 12-i are decoded by the decoder 32. The decoder 32 controls the frequency dividing ratio of the multi-modulus frequency divider 8 via the control line 16b. The input of the decoder 32 is connected to K sampling registers 12-i. If the delta/sigma frequency discriminator 1 in a simple exemplary embodiment contains two sampling registers 12-0, 0, 12-1, the data outputs 17-0, 17-1 of which are decoded by the decoder 32, there will be three different data combinations at the input of the decoder 32, which are:

TABLE 1

| Decoder input | Dividing factor |
| --- | --- |
| 0 0 | N |
| 0 1 | N + L |
| 1 1 | N + 2L |

The decoder switches the dividing factor of the multi-modulus frequency divider 8 between the dividing factors listed in Table 1 in dependence on the decoder input. In this arrangement, N is typically greater than L, for example N=94 and L=4.

If, in a further embodiment, the delta/sigma frequency discriminator 1 contains two delay elements 30-1, 30-2 in the delay circuit 30 and three sampling D-type flip-flops 12-0, 12-1, 12-2, the decoder 32 sets the dividing factors of the multi-modulus divider 8 in accordance with the following table:

TABLE 2

| Decoder input | Dividing factor |
| --- | --- |
| 0 0 0 | N |
| 0 0 1 | N + L |
| 0 1 1 | N + 2L |
| 1 1 1 | N + 3L |

The number of switchable dividing factors corresponds to the number K of the sampling D-type flip-flops 12-i plus one.

In a preferred embodiment, the decoder 32 contains a bubble correction logic for detecting and eliminating meta stability problems at data outputs of the sampling D-type flip-flops 12-i. If, for example, the delta/sigma frequency discriminator 1 has eight sampling D-type flip-flops 12-i (k=8) and if a faulty data value occurs at the signal output 17-5 of the D-type flip-flop 12-5, the faulty data pattern present at the input of the decoder 32 is "0 0 0 1 0 1 1 1 1" instead of the correct data pattern "0 0 0 1 1 1 1 1". In this case, the internal correction logic of the decoder 32 corrects the faulty fifth input databit.

The frequency $F_V$ of the input signal present at the first signal input 2 is much higher than the frequency $F_R$ of the reference clock signal present at the second signal input 3. For example, the frequency of the input signal $F_V$=2,394.6 MHz and the frequency $F_R$ of the reference clock signal is only 26 MHz. In the embodiment shown in FIG. 5, the delay elements of the delay circuit 30 in each case have a delay time τ=255 picoseconds and eight delay elements are serially connected together. This leads to a uniform fluctuation with an amplitude of 255 picoseconds/4 with an output signal comprising three bits, the delay circuit 30 containing eight delay elements and the sampling register 12 containing eight sampling D-type flip-flops 12-i. In this preferred embodiment, the multi-modulus frequency divider 8 divides the input signal present, for example, with dividing factors 91, 92, 93 . . . 98 (N=90, L=1) in dependence on the decoder output control signal.

FIG. 6 shows a fourth embodiment of the delta/sigma frequency discriminator 1 according to the invention, the delay circuit 30 being additionally preceded by a dither circuit 15. The dither circuit 15 varies the clock period T of the reference clock signal present at the signal input of the delay circuit 30 randomly so that any interfering modulation tones which may occur are further suppressed.

FIG. 7 shows a fifth embodiment of the delta/sigma frequency discriminator 1 according to the invention, the data inputs 13-i of the sampling D-type flip-flops 12-i in this embodiment being connected to the signal output of the frequency divider 8 and the clock signal inputs 11-i of the D-type flip-flops 12-i being connected to the delay circuit 30.

Figure 1:
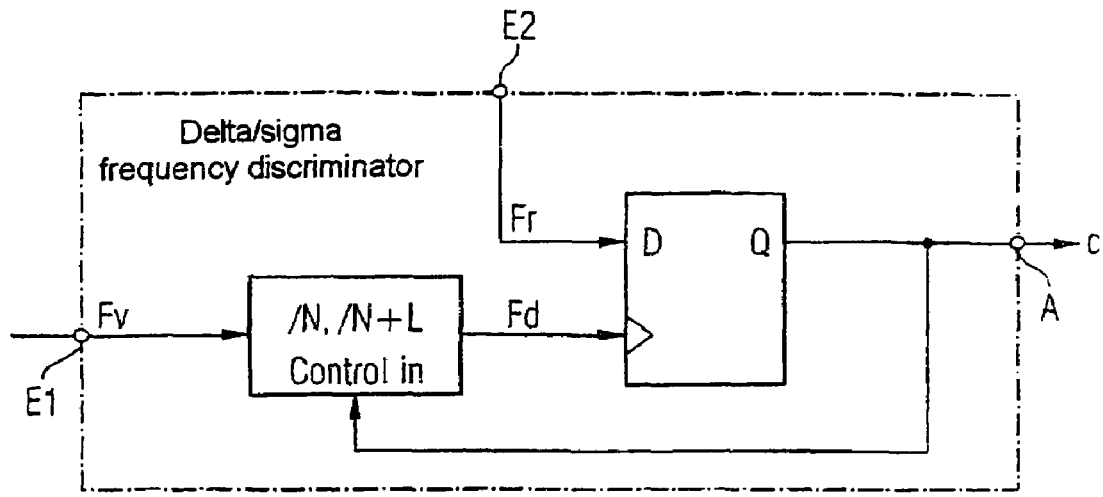
FIG. 1 shows a delta/sigma frequency discriminator according to the prior art.

FIG. 8 shows the output spectrum of the digital output signal C delivered at the digital output 6 of the delta/sigma frequency discriminator 1 according to the invention, in comparison with the conventional delta/sigma frequency discriminator shown in FIG. 1.

As can be seen from FIG. 8, the delta/sigma frequency discriminator $DSD_{STDT}$ according to the prior art exhibits a large number of interfering modulation tones with a constant input signal, particularly in the higher frequency range, i.e. the energy of the digital output signal C is concentrated on particular frequencies. This can be seen from the greatly fluctuating amplitude of the energy spectrum at higher frequencies.

By comparison, the delta/sigma frequency discriminator 1 according to the invention exhibits a much more uniform signal spectrum of the digital output signal, the amplitude of the signal spectrum rising uniformly with increasing frequency. Due to the digital low-pass filter provided at the output 6 of the delta/sigma frequency discriminator 1 according to the invention, the output signal spectrum shown in FIG. 8 can be further equalized so that it loses its high-pass-shaped characteristic.

What is claimed is:

1. Delta/sigma frequency discriminator for converting a frequency of an input signal into a digital output signal, comprising:

a) a frequency divider which divides the input signal at a frequency dividing ratio which can be switched in dependence on the digital output signal;

b) with at least one sampling register which samples the divided input signal by means of a reference clock signal for generating the digital output signal, and with a dither circuit which randomly varies the clock period of the reference clock signal so that interfering modulation tones in the signal spectrum of the digital output signal are suppressed.

2. Delta/sigma frequency discriminator according to claim 1, wherein the frequency of the input signal is higher than the clock frequency of the reference clock signal.

3. Delta/sigma frequency discriminator according to claim 1, wherein the reference clock signal is generated by a reference clock generator.

4. Delta/sigma frequency discriminator according to claim 1, wherein the sampling register is a D-type flip-flop.

5. Delta/sigma frequency discriminator according to claim 4, wherein the D-type flip-flop has a clock signal input at which the input signal divided by the frequency divider is present.

6. Delta/sigma frequency discriminator according to claim 4, wherein the D-type flip-flop has a data input which is connected to the dither circuit.

7. Delta/sigma frequency discriminator according to claim 4, wherein the D-type flip-flop has a clock signal input which is connected to the dither circuit.

8. Delta/sigma frequency discriminator according to claim 4, wherein the D-type flip-flop has a data input at which the input signal divided by the frequency divider is present.

9. Delta/sigma frequency discriminator according to claim 4, wherein the D-type flip-flop has a data output for delivering the digital output signal, which is connected to the frequency divider via a control line.

10. Delta/sigma frequency discriminator according to claim 1, wherein the digital output signal is filtered by a subsequent digital low-pass filter.

11. Delta/sigma frequency discriminator according to claim 1, wherein the dither circuit has:
    (a) a signal delay chain with a number of serially interconnected signal delay elements which delay the reference clock signal present, and
    (b) a multiplexer with a number of inputs which are in each case connected to one output of a delay element, the multiplexer switching the inputs through to its output in dependence on a random control signal.

12. Delta/sigma frequency discriminator according to claim 11, wherein the dither circuit has a random signal generator for generating the random control signal.

13. Delta/sigma frequency discriminator according to claim 11, wherein the dither circuit has a synchronizing circuit which synchronizes the switching between the inputs of the multiplexer.

14. Delta/sigma frequency discriminator according to claim 1, wherein a number of sampling registers are connected together in parallel.

15. Delta/sigma frequency discriminator according to claim 14, wherein the sampling registers connected together in parallel are D-type flip-flops.

16. Delta/sigma frequency discriminator according to claim 15, wherein the divided input signal is present at the clock signal inputs of the D-type flip-flops.

17. Delta/sigma frequency discriminator according to claim 15, wherein the clock signal inputs of the D-type flip-flops are connected to the dither circuit.

18. Delta/sigma frequency discriminator according to claim 1, wherein the dither circuit is followed by a signal delay circuit having a number of serially interconnected signal delay elements.

19. Delta/sigma frequency discriminator according to claim 18, wherein the outputs of the signal delay elements are connected to the data inputs of the D-type flip-flops connected together in parallel.

20. Delta/sigma frequency discriminator according to claim 18, wherein the outputs of the signal delay elements are connected to the clock signal inputs of the D-type flip-flops 12-i connected together in parallel.

21. Delta/sigma frequency discriminator according to claim 19, wherein the outputs of the D-type flip-flops connected together in parallel are connected to a decoder which delivers the digital output signal.

22. Delta/sigma frequency discriminator according to claim 14, wherein the frequency divider is a multi-modulus frequency divider.

23. Delta/sigma frequency discriminator for converting a frequency of an input signal into a digital output signal, comprising:
    a) a frequency divider which divides the input signal at a frequency dividing ratio which can be switched in dependence on the digital output signal,
    b) a delay circuit consisting of a number of delay elements for delaying a reference clock signal;
    c) the signal outputs of the delay elements being connected to sampling registers which sample the delayed reference clock signal by means of the divided input signal for generating a quantized reference clock signal comprising a number of bits, and with
    d) a decoder which decodes the quantized reference clock signal for generating the digital output signal.

24. Delta/sigma frequency discriminator according to claim 23, wherein the digital output signal is filtered by a subsequent digital low-pass filter.

25. Delta/sigma frequency discriminator according to claim 23, wherein the sampling registers are D-type flip-flops.

26. Delta/sigma frequency discriminator according to claim 23, wherein the frequency divider is a multi-modulus frequency divider.

27. Delta/sigma frequency discriminator according to claim 23, wherein the delay circuit is preceded by a dither circuit which randomly varies the clock period of the reference clock signal.

* * * * *